United States Patent
Stolarczyk et al.

(10) Patent No.: US 9,541,641 B2
(45) Date of Patent: Jan. 10, 2017

(54) METHOD OF ELECTRONICALLY MAPPING UNDERGROUND UTILITY INFRASTRUCTURES FROM THE SURFACE

(71) Applicants: Gerald L. Stolarczyk, Placitas, NM (US); Larry G. Stolarczyk, Raton, NM (US); Igor Bausov, Raton, NM (US)

(72) Inventors: Gerald L. Stolarczyk, Placitas, NM (US); Larry G. Stolarczyk, Raton, NM (US); Igor Bausov, Raton, NM (US)

(73) Assignee: Stolar, Inc., Raton, NM (US)

( * ) Notice: Subject to any disclaimer, the term of this patent is extended or adjusted under 35 U.S.C. 154(b) by 0 days.

(21) Appl. No.: 14/970,575

(22) Filed: Dec. 16, 2015

(65) Prior Publication Data

US 2016/0097879 A1 Apr. 7, 2016

Related U.S. Application Data

(63) Continuation-in-part of application No. 14/150,736, filed on Jan. 8, 2014, now Pat. No. 9,207,307, and a
(Continued)

(51) Int. Cl.
| | | |
|---|---|---|
| *G01V 3/00* | (2006.01) | |
| *G01V 3/10* | (2006.01) | |
| *G01S 13/88* | (2006.01) | |
| *H04W 4/04* | (2009.01) | |
| *G01S 13/86* | (2006.01) | |
| *G01S 13/89* | (2006.01) | |
| *G01V 3/12* | (2006.01) | |

(Continued)

(52) U.S. Cl.
CPC .............. *G01S 13/885* (2013.01); *G01S 7/414* (2013.01); *G01S 13/86* (2013.01); *G01S 13/867* (2013.01); *G01S 13/89* (2013.01); *G01V 3/12* (2013.01); *H01Q 1/3216* (2013.01); *H01Q 1/521* (2013.01); *H01Q 21/062* (2013.01); *H04W 4/046* (2013.01); *G01S 2007/027* (2013.01); *G01V 3/17* (2013.01)

(58) Field of Classification Search
CPC .................................... G01V 3/00; G01V 3/10
USPC ......................................................... 324/329
See application file for complete search history.

(56) References Cited

U.S. PATENT DOCUMENTS

| | | |
|---|---|---|
| 7,336,079 B2 | 2/2008 | Stolarczyk et al. |
| 7,629,790 B2 | 12/2009 | Stolarczyk et al. |

(Continued)

*Primary Examiner* — Bot Ledynh
(74) *Attorney, Agent, or Firm* — Richard B. Main; Main Law Cafe

(57) ABSTRACT

A non-invasive method of buried-utility-mapping includes using a long wavelength gradiometric ground penetrating radar to "see" patches of conductive material below ground and buried pipes and electrical conductors that are all constantly radio-illuminated by local AM radio broadcasts. The underground infrastructure of entire cities can be surveyed this way, point-by-point over time. A short wavelength part of the gradiometric ground penetrating radar operates shoulder-to-shoulder with the magnetic part and is able to improve shallow object resolution, map moisture build-ups under roads, and spot contaminated soils. Two gradiometric ground penetrating radar technologies, cameras, and navigation receivers can be mounted on city vehicles and a daily collection of their data batch transformed by digital processing algorithms into detailed and automatically updating false-color maps of the underground utilities of the whole city and other buried infrastructures.

4 Claims, 12 Drawing Sheets

Related U.S. Application Data continuation-in-part of application No. 14/152,823, filed on Jan. 10, 2014, now Pat. No. 9,207,316, and a continuation-in-part of application No. 14/555,566, filed on Nov. 26, 2014, now abandoned, and a continuation-in-part of application No. 14/477,090, filed on Sep. 4, 2014.

(60) Provisional application No. 62/214,981, filed on Sep. 6, 2015.

(51) Int. Cl.
| | | |
|---|---|---|
| *G01S 7/41* | (2006.01) | |
| *H01Q 1/32* | (2006.01) | |
| *H01Q 1/52* | (2006.01) | |
| *H01Q 21/06* | (2006.01) | |
| G01V 3/17 | (2006.01) | |
| G01S 7/02 | (2006.01) | |

(56) References Cited

U.S. PATENT DOCUMENTS

| | | |
|---|---|---|
| 7,675,289 B1 | 3/2010 | Stolarczyk et al. |
| 2013/0050008 A1 | 2/2013 | Atkins et al. |

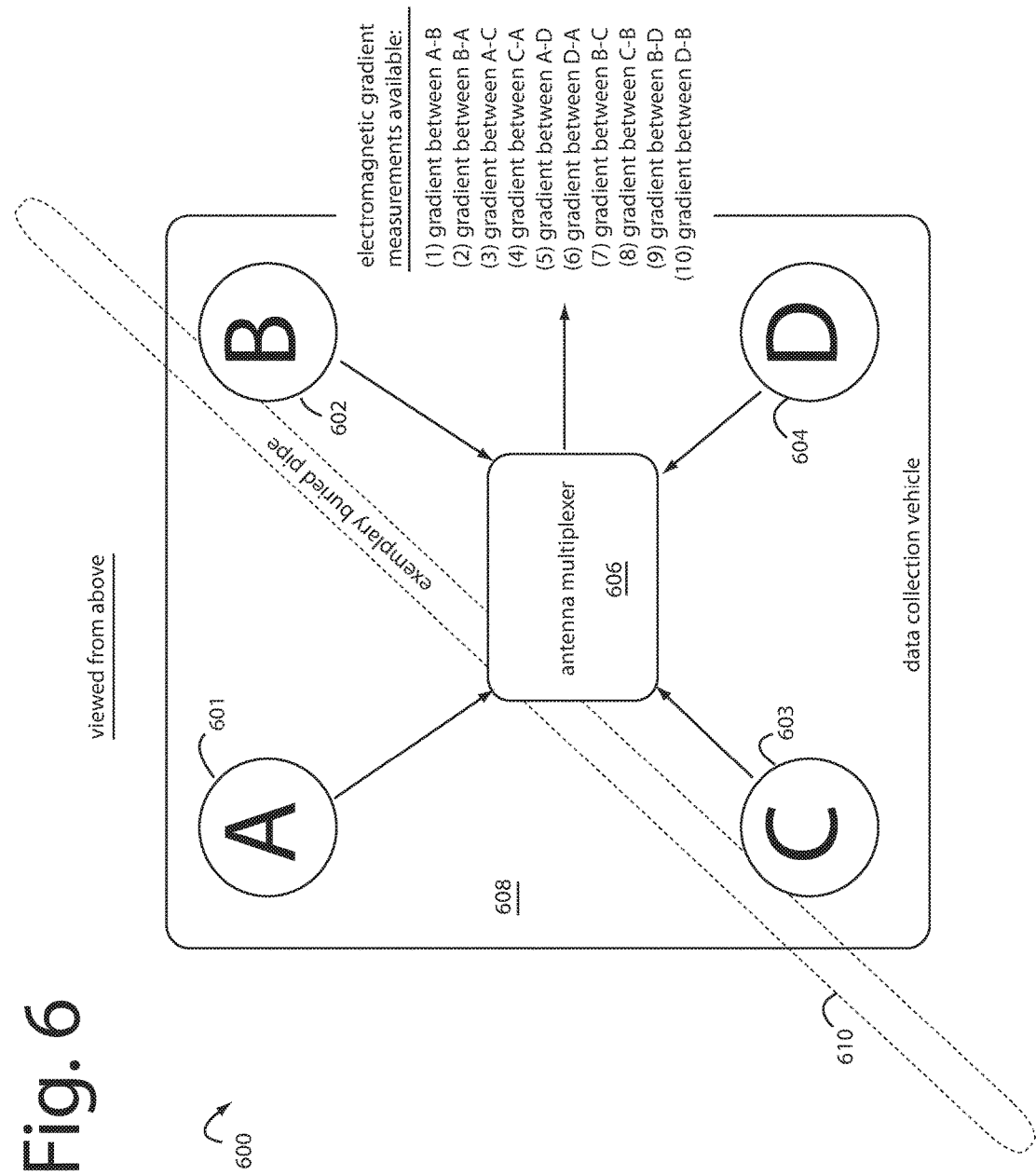

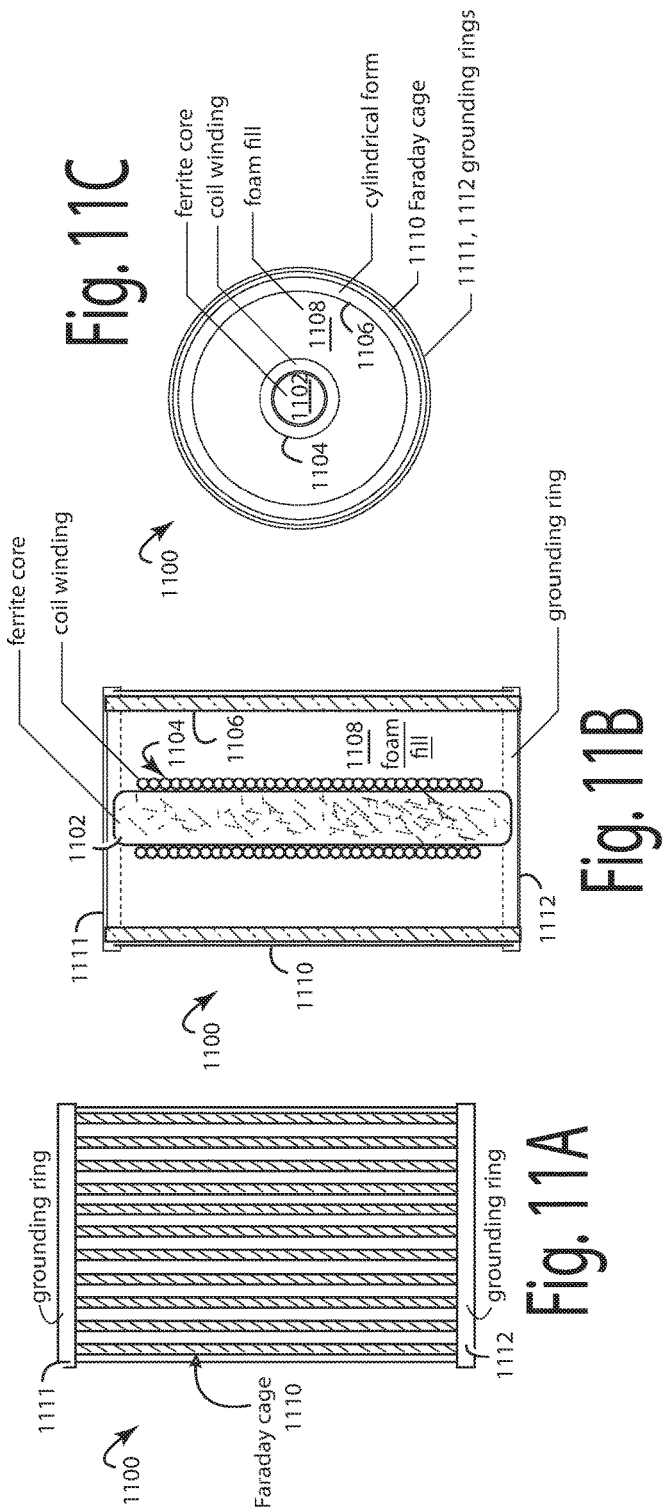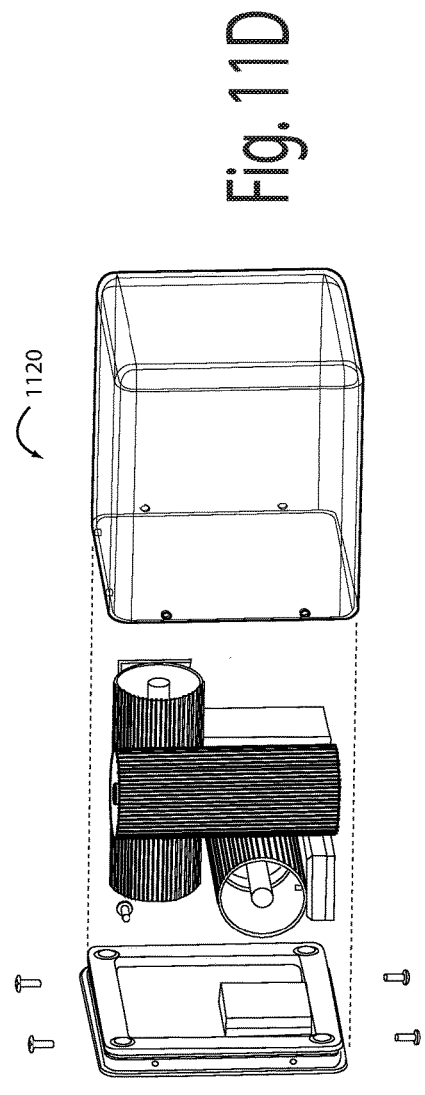

METHOD OF ELECTRONICALLY MAPPING UNDERGROUND UTILITY INFRASTRUCTURES FROM THE SURFACE

BACKGROUND

1. Field of the Invention

The present invention relates to electronically finding, locating, and mapping buried urban utilities electronically from the immediate surface above, and more particularly to blending of ground penetrating radar and electromagnetic gradiometer images and surface position fixes and then incrementally improving the displayable results with multiple passes.

2. Description of the Problems to be Solved

Finding stray, broken, lost, forgotten, misplaced, prohibited, or unlawful segments of pipes, utilities, and wires buried in the soil can be important for any number of construction, maintenance, security, defensive, economic, and operational reasons. Old maps, diagrams, notes, memories, and visual spotting are unreliable and fatiguing. Conventional electronic methods have not been performing as well as needed.

Electro-magnetic fields can both be induced into and sensed from wires and pipes from above on the ground surface of an area. Re-radiated magnetic fields can provide telltales of the locations and orientations of metallic and other electrically conductive objects, especially long metal pipes and wires.

Long-wavelength, gradiometric ground-penetrating radar (gGPR) methods can do better at mapping than conventional ground-penetrating radars (GPR) which use short-wavelength radar techniques like those developed during WW-II by the MIT Radiation Laboratory. The construction industry, in particular, has suffered a high rate of failures in the use of modern commercial versions of such short-wavelength GPR. A recent example of such a technology failure was demonstrated at Los Angeles airport during a reconstruction project when ground drilling ruptured a high-pressure gas line and the resulting leaking flammable gas exploded. A second misadventure hit an underground utility power supply to Terminal-I knocking out all power, and a third misadventure cut a large sewage line and flooded the nearby TSA headquarters with black water.

Gradiometric ground penetrating radar (gGPR) instrumentation and signal processing functionality takes the spatial or time domain derivative of phase-coherent illuminating and scattered/reflection radar signals. In the near field, Taylor's theorem derivatives of these signals determine distance to scattering/reflecting objects buried below a spatial cluttering geologic reflecting (SCGR) interface. The derivative of far field illuminating and reflecting interface plane wavefront is zero, making for high gain and high signal-to-noise-ratio detection.

Signal gradients can be very pronounced and change rapidly as electromagnetic gradiometer detection equipment is moved over areas with buried pipes and wires. These conductive objects will naturally re-radiate secondary electro-magnetic emissions. In contrast, far-field primary emissions from distant sources are characterized by near-zero difference signal gradients in the local area. Near-fields are dominated by dipole-type electric or magnetic fields. The sensing equipment has only to distinguish between the electric primary and magnetic secondary signal types to recognize nearby targets.

At least two basic kinds of gradiometer instruments have been used to measure magnetic field gradients. An axial gradiometer type places two magnetometers head-to-head on the same axis and wires them in series so they automatically cancel the common mode signals. Such measure the difference in the magnetic flux at a point. A planar gradiometer type spaces two magnetometers in parallel apart from one another to subtract one from the other at the receiver. The difference is the differential magnetic flux between the two magnetometers. For example, refer to our U.S. Pat. No. 7,675,289, issued Mar. 9, 2010. The axial and planar types will respond differently to spatial signals. The magnetic field component directions relative to the device's spatial orientation can be measured with vector magnetometers.

A single magnetometer can be used to collect readings point-by-point over a survey area. Each reading at each point is stored in a table and then the apparent magnetic gradients can be computed and displayed on a map. A three-axis magnetometer in a single pod can provide x,y,z magnetic axes measurements for even more complex calculations and information extraction.

Gradiometer instrumentation can sometimes be challenging to accommodate because of its size. Even full-size ground, air, and water vehicles can be pressed to provide enough room. The size, weight, and power (SWAP) requirements of new kinds of onboard sensors and devices can sometimes be too much for first generation systems. This is especially true of small remote-controlled vehicles, robots, and drones that are not fully integrated. In contrast, stand-alone sensors developed as individual mix-and-match add-ons waste too much in resources, and the combinations are difficult to house in tight accommodations.

Stolar Research Corporation (Rio Rancho, N. Mex.) has developed a broad line of vertical magnetic gradiometers (VMG) that can be used singularly, in pairs, and in arrays to sweep over roadways and open fields. Stolar VMG's can be carried by personnel on foot, vehicles, airplanes, kites, robots, and even as EMG sondes on drones. These products all descended from Stolar's earlier work with EM gradiometers on measuring coal deposits in underground mines.

New advances here in the remote sensing sciences combine multi-purpose, collocated sensors that also share system resources.

The American Public Works Association (APWA) has been promulgating its Uniform Color Code for Marking Underground Facilities Underground facilities. They want everyone to use colors of spray paint to mark on the ground surface the locations of buried utilities in accordance with a following designated color code.

| | |
|---|---|
| White | Pre-marking of the outer limits of the proposed excavation or marking the centerline and width of proposed lineal installations of buried facilities. |
| Pink | Temporary Survey Markings. |
| Red | Electric power lines, cables or conduit, and lighting cables. |
| Yellow | Gas, oil, steam, petroleum, or other hazardous liquid or gaseous materials. |
| Orange | Communications, cable TV, alarm or signal lines, cables or conduits. |
| Blue | Potable Water, irrigation, and slurry lines. |
| Purple | Slurry and reclaimed. |
| Green | Sewers, drainage facilities or other drain lines. |

The APWA guidelines for uniform temporary marking of underground facilities provides for universal use and understanding of the temporary marking of subsurface facilities to prevent accidents and damage or service interruption by contractors, excavators, utility companies, municipalities or any others working on or near underground facilities. Their One-Call damage prevention system is often required by Law to be contacted prior to excavation. White marks are painted or chalked to show the location, route or boundary of proposed excavation. Surface marks on roadways do not exceed 1.5" by 18" (40 mm by 450 mm). The facility color and facility owner identity may be added to white flags or stakes. Color-coded surface marks are used to indicate the location or route of active and out-of-service buried lines. Color-coded vertical markers (stakes or flags) are used to increase visibility and supplement surface marks. Marks and markers indicate the name, initials or logo of the company that owns or operates the line, and width of the facility if it is greater than 2" (50 mm). Marks placed by other than line owner/operator or their agents are used to identify the designating firm. Multiple lines in a joint trench are marked in tandem. If the surface over the buried line is to be removed, supplementary offset markings are used. Offset markings are on a uniform alignment and meant clearly indicate the actual facility is a specific distance away.

Any excavation within the tolerance zone must be done with non-powered hand tools and other non-invasive methods until the marked facility is exposed. The width of the tolerance zone may be specified by Law. If not, a tolerance zone including the width of the facility plus 18" (450 mm) measured horizontally from each side of the facility is recommended. The American Public Works Association encourages public agencies, utilities, contractors, other associations, manufacturers and all others involved in excavation to adopt the APWA Uniform Color Code, using ANSI standard 2535.1 Safety Colors for temporary marking and facility identification.

However, marking all the buried utilities in a whole city or even an airport is not very practical using the APWA methods. The conventional utility locating tools commonly used are only useful in small areas when lots of time is available.

SUMMARY OF THE INVENTION

Briefly, a non-invasive method embodiment of the present invention of buried utility mapping includes using long wavelength gradiometric ground penetrating radar to "see" patches of conductive material below ground and buried pipes and electrical conductors that are all constantly radio-illuminated by local AM radio broadcasts. Entire cities can be surveyed this way, point-by-point over time. A short wavelength part of the gradiometric ground penetrating radar operates shoulder-to-shoulder with the magnetic part and is able to improve shallow object resolution, map moisture build-ups under roads, and spot contaminated soils. Pot-holes can be predicted before the road fails because it is the excess moisture buildup that always precipitates pot-holes. In one embodiment, the two gradiometric ground penetrating radar technologies, cameras, and navigation receivers are mounted on city vehicles and a daily collection of their data is batch transformed by digital processing algorithms into detailed and automatically updating false-color maps of the underground utilities of the whole city and other buried infrastructures. Trolley vehicles have been used to map the pipe locations and seepage zones in earthen dams.

These and other objects and advantages of the present invention will no doubt become obvious to those of ordinary skill in the art after having read the following detailed description of the preferred embodiments which are illustrated in the various drawing figures.

IN THE DRAWINGS

FIG. 6 is a plan view diagram of how four antennas can be multiplexed into pairs that yield a variety of gradient orientations and improve data collection of the EMG;

FIGS. 11A-11C are side, cross-section, and top view diagrams showing one way to construct shielded, magnetic field antennas;

FIG. 11D is a perspective, exploded assembly view diagram showing how three antennas in a tri-axial arrangement can be orthogonally disposed in a weatherproof housing;

DETAILED DESCRIPTION OF THE PREFERRED EMBODIMENT

Figure 1:
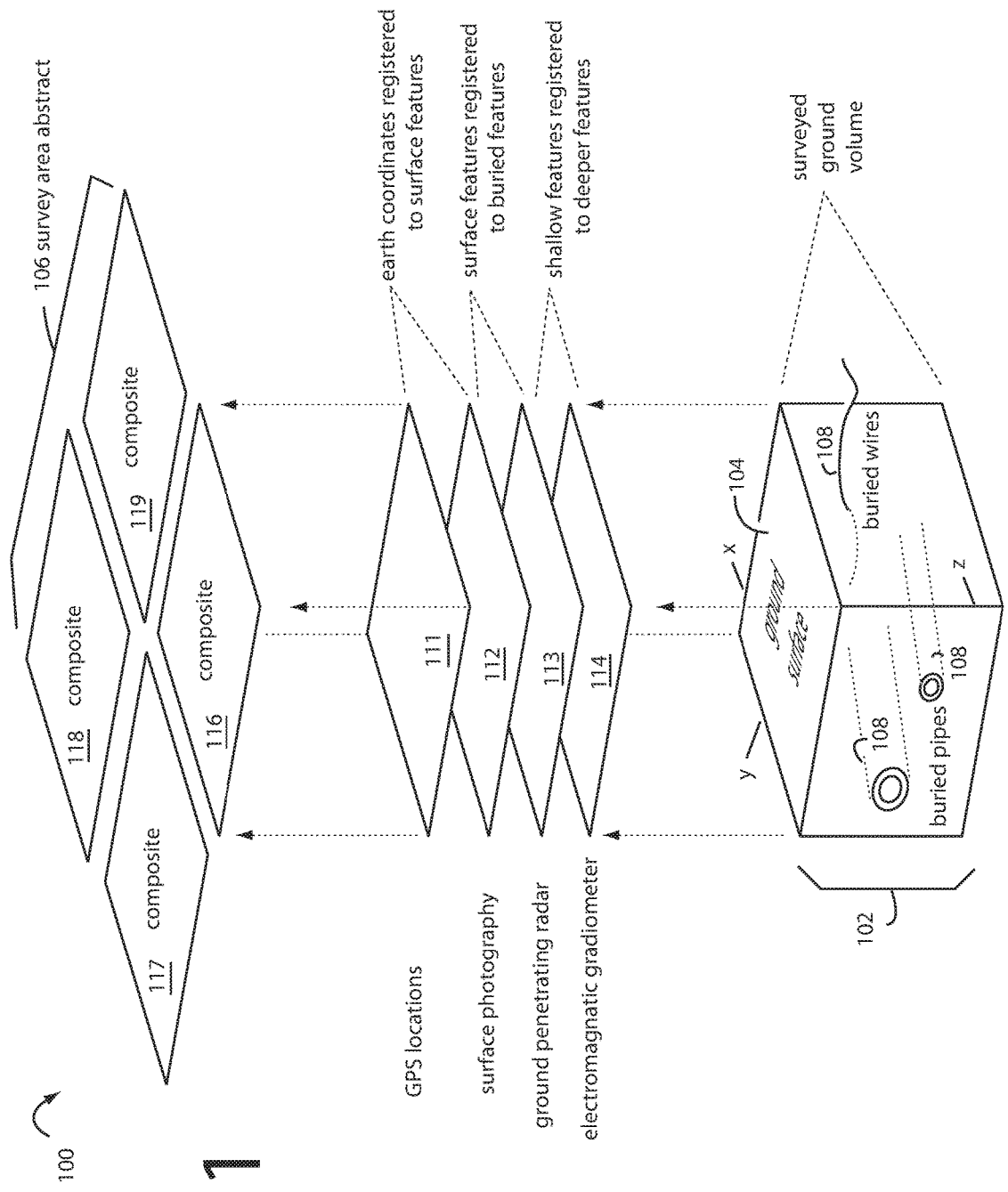
FIG. 1 is a perspective view diagram representing how each vertical column of earth is scanned with various GPS, camera, GPR, and EMG sensors to each produce a "tile" in a stack, and how many such stacks are assembled to electronically represent the buried infrastructure in a search area.

A method of mapping underground utility infrastructures and other buried objects begins by investigating buried objects point-by-point in an immediate search area of a ground surface radio illuminated by a radio broadcast transmitter in the 500-kHz to 1,000-kHz band transmitting from a location outside the immediate search area. Then, sensing together short-wavelength reflections of 100-MHz to 2,000-MHz and long-wavelength scattering of the electro-magnetic radio energy of the radio broadcast transmitter from buried objects underneath in layered soils with a surface-based measurement of buried-object signals using at least a phase-coherent elimination of ground surface reflection noise of at least sixty decibels in digital signal processing with a field programmable gate array (FPGA). Then interpreting signals and displaying visual representations and characteristic descriptions of underground utility infrastructures and the buried objects sensed together, located, and clarified, with a mapping apparatus capable of displaying aeronautical charts, satellite images, elevation maps, and geographically referenced overlays that can be displayed and printed over any map background.

Buried-utility-detection embodiments of the present invention leverage the electromagnetic (EM) radiation from conductive objects in the soils that results from the radio energy they absorb from local longwave AM-radio broadcasts in the 500-kHz to 1-MHz radio spectrum. The horizontal electric fields from such broadcasts will induce secondary currents in conductive soils and any underground conductors if the electric fields get captured and scattered. Long-wavelength scattered electro-magnetic fields will return reflections in the form of spherically and/or cylindrically spreading waves through and up to the surface where their gradients over short distances are detectable by a gradiometer. Our U.S. Pat. No. 7,675,289, issued Mar. 9, 2010, provides important details of construction, operation, and use of electromagnetic gradiometers (EMG's), but the EMG's we now use in embodiments of the present invention are improvements over our 2010 state-of-the-art.

Buried-utility-detection embodiments of the present invention also leverage special earth penetrating radars in the 100-MHz to 2,000-MHz range with special phase-coherent elimination of ground surface reflection noise of at least sixty decibels in digital signal processing with a field programmable gate array (FPGA). For background, see United States Patent Application, Published Application US 2014/0125509 on May 8, 2014, filed Jan. 10, 2014 as Ser. No. 14/152,823, and titled RADAR FOR REJECTING AND LOOKING PAST SURFACE REFLECTIONS, is incorporated herein by reference.

Herein lies a first advantage of our electromagnetic gradiometers in this application, the radio energy used for detection of underground utility infrastructures travels only once through the overburden. Active radar from the surface, by its nature, forces the radio energy used for detection to travel twice through the overburden, e.g., down through the surface to a buried object, and then back up through the surface. Making radar only useful in imaging shallow depths. Conventional active radar also suffers from a "surface glare" of radio energy because the ground surface is very reflective to radar. Even more so if wet with puddles and dew.

The cylinder centerline, e.g., of a wire or pipe, will typically be nearby, down in the ground only a few feet. So the gradiometric spatial differences in magnetic tilt will be measurable between even modest displacements of antenna locations of six feet or less. The illuminating and scattered EM field components are always phase-coherent with respect to each other, and therefore synchronous radio detection methods are usefully employed.

Differences in the EM fields measured at different antenna locations are related to the spatial gradient, differential, difference or derivative.

A vertical magnetic gradiometer (VMG) can usually be carried over a search area surface pretty easily by a motor vehicle. The VMG has a spot of sensitivity which is oriented to stay nadir on the ground to the VMG itself. A Faraday shield surrounds each VMG antenna to screen out near-field electric dipole signals. A ferrite rod core and winding inside can then act as an antenna sensitive to only near-field magnetic dipole signals. Such magnetic dipole signals will radiate from nearby conductors if the conductors are in an electric radio field. The VMG on its vehicle calls on all the points in the search area to collect and measure the available magnetic signal gradients and reversals point-by-point. The points that are nadir to the VMG coincide with buried conductors will express characteristic signatures in the signal gradients and phase reversals measureable in the VMG antenna. Even changes in the receiver's background noise will indicate important features in the soils.

FIG. 1 represents a point-by-point vertical column of earth 102 topped by a ground surface 104 with x-axis and y-axis dimensional portions of a survey area 106. This vertical column of earth 102 is abstracted in a z-axis (depth) and rendered in batch data processing later as a voxel in a false-color visual display apparatus of the present invention. Such is continually updated and improved with new bits of information as they are gathered from the field. For example the way Google Maps is a patchwork of many inputs from many sources over random time periods.

The "false-colors" used would be more familiar to utility workers if the APWA Marking System were employed for the display screens.

| APWA Marking System | |
|---|---|
| White | Pre-marking of the outer limits of the proposed excavation or marking the centerline and width of proposed lineal installations of buried facilities. |
| Pink | Temporary Survey Markings. |
| Red | Electric power lines, cables or conduit, and lighting cables. |
| Yellow | Gas, oil, steam, petroleum, or other hazardous liquid or gaseous materials. |
| Orange | Communications, cable TV, alarm or signal lines, cables or conduits. |
| Blue | Potable Water, irrigation, and slurry lines. |
| Purple | Slurry and reclaimed. |
| Green | Sewers, drainage facilities or other drain lines. |

A "voxel" in computer-based modeling or graphic simulation is an element of an array of elements of volume that create a imaginary three-dimensional space, especially each of an array of discrete elements into which a representation of a three-dimensional object is divided. The purpose is finding, locating, and mapping buried urban utilities 108 electronically from the immediate surface above, and more particularly to incrementally improving blending of multiple sensors and painting composite images.

Essentially, only one electronic voxel of a vertical column of earth 102 can be collected at a time as stacked tiles 111-114, and so many snapshots are needed to be collected before a survey area abstract 106 can be fully painted or rendered into an informational display. Here, stacked tiles 111-114 comprise GPS location fixes 111, a photograph 112, a GPR measurement 113, and an EMG measurement 114, all mutually registered with one another. Together these are electronically assembled by image processors into a composite tile 116. Such has neighboring composite tiles 117-119.

Embodiments of the present invention measure the search area in several dimensions, one is to measure the differences in magnitude at changing locations of an EMG antenna to observe spatial derivatives. Subsequent antenna locations yield more spatial derivatives. These derivatives are subtracted to yield a local gradient and to suppress the far stronger planar wavefronts of the illuminating AM-Radio Broadcasts. Conventional gradient-subtraction algorithms require many antenna receivers and phase coherency between them to suppress the illuminating EM-waves.

Other measurement dimensions include shortwave radar, photography, and navigation fixes. One recent development of ours places neutron generators above ground on the surface over where plastic PVC pipes are suspected to lay. The piping is filled with $N_2$ nitrogen gas if possible. When a neutron from the neutron generator strikes a nitrogen molecule, it will create an isotope with a very brief half-life. The chlorine molecules in the PVC pipe may also be struck with such neutrons. When these nitrogen and/or chlorine isotopes decay they will emit gamma rays with energy signatures that can be detected and recognized by gamma ray detection equipment very common to the explosives detectors now in widespread use at airports and security checkpoints.

Toxic plume contamination can be detected by increases in the background noise (EM fields) that appears when scanning over abnormal zones. Earlier test observations later confirmed such readings to actually be the result of toxic plume contamination. Toxic plume contaminations are conductive and electrically contrast with surrounding soils because anaerobic bacteria metabolic processes produce hydrogen sulfide, methane and enzymes. Non-uniform scattered wavefronts result and are detectable with gradiometric processing.

| OPERATIONAL SUMMARIES |
|---|
| EMG (Orion) operates with very low frequency |
| 200 kHz to 1 MHz nominal<br>Excellent penetration depth, less inherent resolution<br>Resolution recovered in our EMG with signal processing<br>GPR operates at medium frequencies |
| 100 MHz to 2 GHz nominal<br>100 to 20,000 shorter wavelength than EMG (Orion)<br>Good resolution, poor to extremely poor penetration depth<br>Inherent physics of higher frequency signal propagation in lossy materials<br>Two-way propagation: out and back; EMG is one-way as background environment provides source signal |

Materials can be electronically characterized by their conductivity, permittivity, and permeability. Such characteristics can easily be probed with radio energy.

GPR fares even worse in even moderately mineralized or wet soil.

| EMG (Orion) IS BEST USED WHEN |
|---|
| detection depth is pre-eminent requirement;<br>need to "see past" smaller objects, e.g., rebar, small metal debris, etc. |

| GPR IS BEST USED WHEN |
|---|
| spatial resolution is pre-eminent requirement |
| EMG (Orion) and GPR ARE BEST USED TOGETHER |
| For maximum detection depth, probability of detection, and to avoid clutter (EMG), and best 3-axis resolution (GPR) |

| A RECENT PROTOTYPE USED IN TESTING HAD: |
|---|
| An EMG (Orion) system with three antennas<br>Combinations of the antennas fashioned three separate gradients;<br>The individual gradients have unique characteristics<br>Each antenna was capable of receiving two frequencies simultaneously;<br>Total combination of antennas and frequencies means there are a total of six gradients available from a single pass of data collection (G1-G6) |

The gradients realized from the ORION EMG prototype were:
G1: Widest antenna separation for deeper target resolution at frequency F1;
G2: Widest antenna separation for deeper target resolution at frequency F2;
G3: Medium antenna separation for mid-depth target resolution at frequency F1;
G4: Medium antenna separation for mid-depth target resolution at Frequency F2;
G5: Narrow antenna separation for shallow target resolution at frequency F1;
G6: Narrow antenna separation for shallow target resolution at frequency F2

The ORION EMG prototype was operated at two frequencies simultaneously. The lower frequencies reached deeper depths of penetration but required long linear targets. The higher frequencies had only shallow depth penetration, but could "see" short length targets.

The Detection Depths and gradients were:
Shallow depths: 0-8 ft. in general;
Mid-deep ranges: 8-15 ft. in general;
Deep ranges are: 15 ft. plus.
Typically, for targets of adequate length:
1. G1 and G2 could detect deep and shallow targets but could not distinguish between closely spaced targets;
2. G3 and G4 could detect targets up to about 15 ft. (depending on soil type and frequency) with stronger gradients that provided a good overall picture;
3. G5 and G6 had trouble resolving targets longer than ten feet, but were the gradients of choice for detecting closely spaced targets.

The ORION EMG prototype was primarily capable of detecting non-linear targets, and secondarily capable of detecting zones of soil contamination. The ORION EMG does not detect gradients in soil contamination, but rather, it detects a rise in the noise floor over a contaminated zone where the contamination had raised the local soil conductivity.

As such, a detectable rise in RF background "noise" will be interpreted as soil contamination. Such soil contamination was not limited to hydrocarbon or other chemical contaminates. Any increase in water moisture properties in situ can also increase background RF "noise" over these "wet" zones. Background RF "noise" increases are seen across all gradients, but they are more pronounced in the mid to deep looking gradients.

The image processing algorithms for the ORION EMG prototype parsed data into one of three categories. The imaging software did not operate on the phase of the gradients, only their magnitudes. An "MAG" imaging process operated on the magnitude of the gradients. It took the highest and lowest amplitude signals from a set of data and did a linear interpolation across the set, assigning colors for visual display. A "SmallMag" imaging process took a set of data, removed the highest amplitude data, and then interpolated the remaining data to span full-scale. The process removed large peaks in the data and highly emphasized small/weak signals. A "CMBD" imaging process combined the other two processes. It removed the large peaks, amplified the weak signals, then re-inserted the large peaks. This process worked good for contaminated soil analysis.

Regardless of which imaging form was selected, the rendered data sets were then color coded relative to the processed magnitude of individual gradient set being worked with. The color scale ranges used ran from deep blue to intense red. The deeper blue color represented the smaller magnitude gradients, meaning nothing was detected. Intense red represented a maximum in gradient amplitudes, indicating a target was detected. Color blends in between were proportional the value of the gradient magnitude at that position, depending on the strength of the signal from a nearby target. The form of imaging used in the ORION EMG prototype was not designed to predict target depths.

Figure 2:
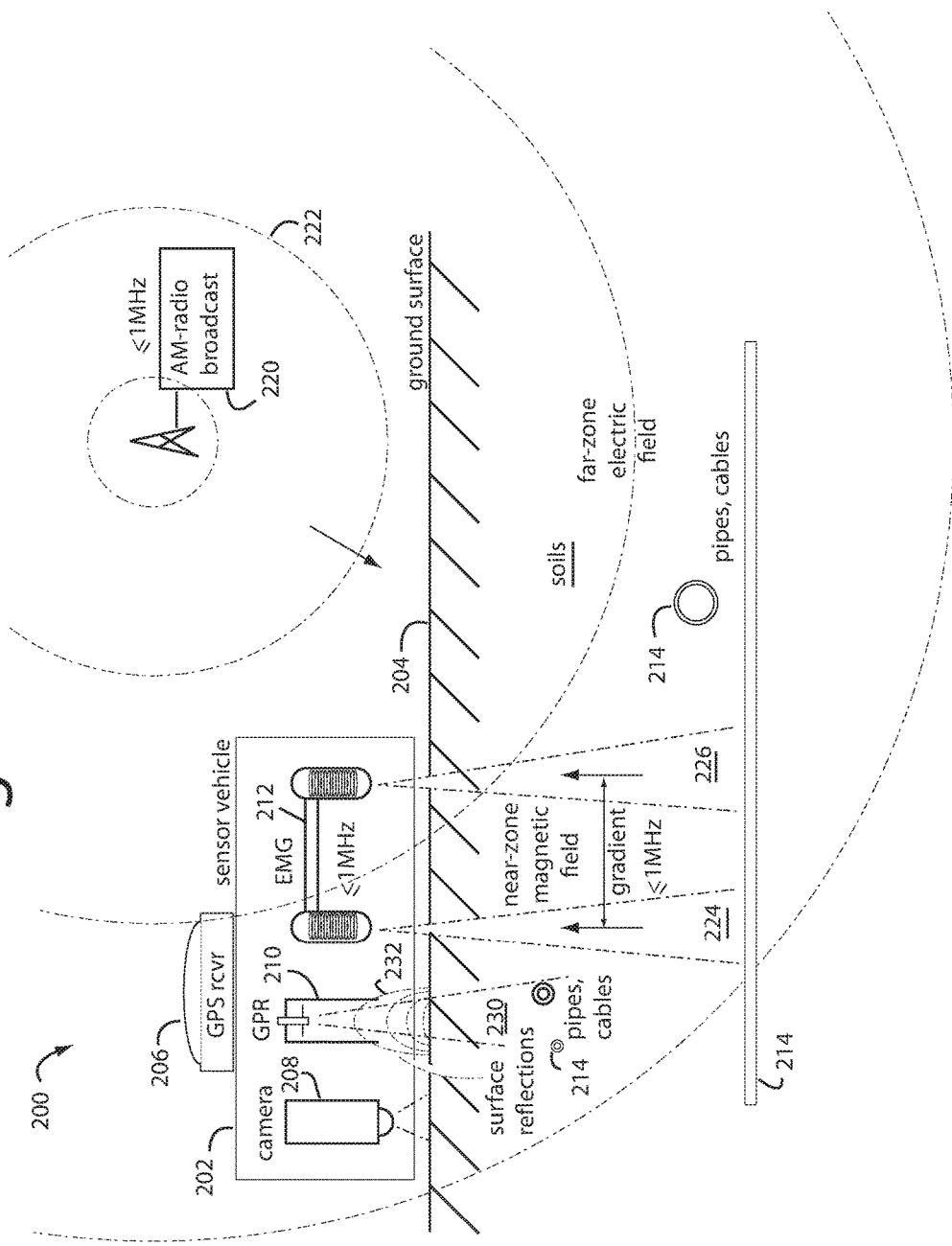
FIG. 2 is a schematic diagram of a multi-sensor data collection vehicle that is moved over the surface of a search area shown here in cross-section, these produce the tile scans of FIG. 1 representing the buried infrastructure in a search area.

FIG. 2 represents a data collection method 200 in which a data collection vehicle 202 is rolled over a ground surface 204 of a survey area. The data collection vehicle 202 is outfitted with several sensors, e.g., a GPS navigation receiver 206, a downward pointing digital camera 208, a ground-penetrating radar (GPR) 210, and an electro-magnetic gradiometer (EMG) 212. A very full description of a suitable GPR for use here will be found in our recently allowed United States Patent Application published as US 2014/0125509, on May 8, 2014, Ser. No. 14/152,823, filed Jan. 10, 2014, and titled RADAR FOR REJECTING AND LOOKING PAST SURFACE REFLECTIONS. Such Application is a parent to this continuation-in-part, and is incorporated herein in full by reference. A very full description of a suitable EMG for use here will also be found in our United States Patent Applications: (1) published as US 2014/0139224, on May 22, 2014, Ser. No. 14/155,566, filed Jan. 15, 2014, and titled STRAY WIRE LOCATION SENSOR; and, (2) published as US 2014/0368196, on Dec. 18, 2014, Ser. No. 14/477,090, filed Sep. 4, 2014, and titled PRACTICAL ELECTROMAGNETIC GRADIOMETER. Such Applications too are parents to this continuation-in-part, and are each incorporated herein in full by reference.

Sensors 206, 208, 210, and 212 are simultaneously operated point-by-point in a search area to obtain their respective data outputs for each point on surface 204 that data collection vehicle 202 visits in a survey. The method objective is to locate by sensing, and map by combination of their outputs, the depths and locations of pipes, conduits, wires, structures, and other buried objects 214 beneath surface 204. A local AM-Radio Broadcast Station 220 outside the search area is depended upon to radiate a strong longwave radio carrier 222 in the 500-kHz to 1-MHz band. Such local AM-Radio Broadcast Station 220 being nearby is serendipitous. Buried objects 214 will capture some of this radio energy and re-radiate electromagnetic signals 224 and 226. These are respectively sensed as magnetic gradients by EMG 212.

GPR 210 operates by sending radio signals 230 in the middle frequencies of 100-MHz to 2,000-MHz into the surface 204. A very strong radio reflection 232 always occurs from the surface. But some of the energy 230 that does penetrate will be returned from buried objects 214. The strong surface reflections 232 are suppressed in signal processing in accordance with our disclosures in Published United States Patent Application US 2014/0125509, May 8, 2014, titled RADAR FOR REJECTING AND LOOKING PAST SURFACE REFLECTIONS, and our other issued patents.

Figure 3:
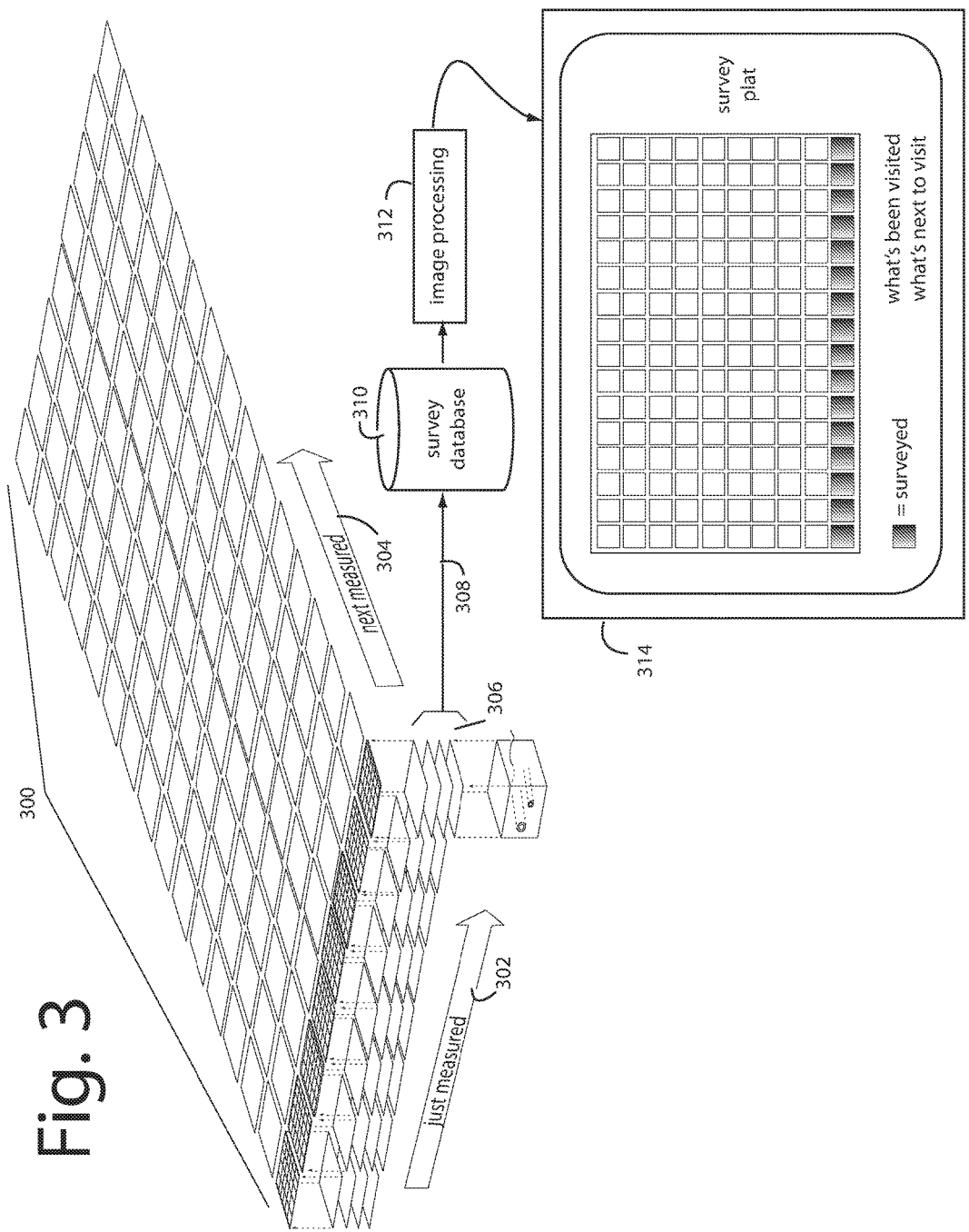
FIG. 3 is a perspective diagram of how a whole search area of multi-sensor data collection is trickled point-by-point into data base and image processing is used to update and refresh a user display screen of maps with overlays of the buried infrastructure in a search area.

FIG. 3 represents how a large search area 300, like a city airport or the whole city itself, can be visually rendered as a map with overlays on a display screen bit by bit, point-by-point, using embodiments of the present invention. Such large search area 300 is, in one regard, a mosaic of tiles, such as composite tiles 116-119 (FIG. 1). There will be tiles representing locations that-have-been-visited 302 and those next-to-be-measured 304. Stacked tile information 306 includes GPS position fixes and photographic surface location fixes and is communicated by a link 308 and collected by a database 310. An image processing algorithm 312 renders the whole visually to a display screen 314. For example, FALCONVIEW™ and SKYVIEW™ by the Georgia Tech Research Institute would be useful. Even partially rendered, display screen 314 will provide important information to construction and utility workers about the buried infrastructures underlying area 300.

Figure 4A:
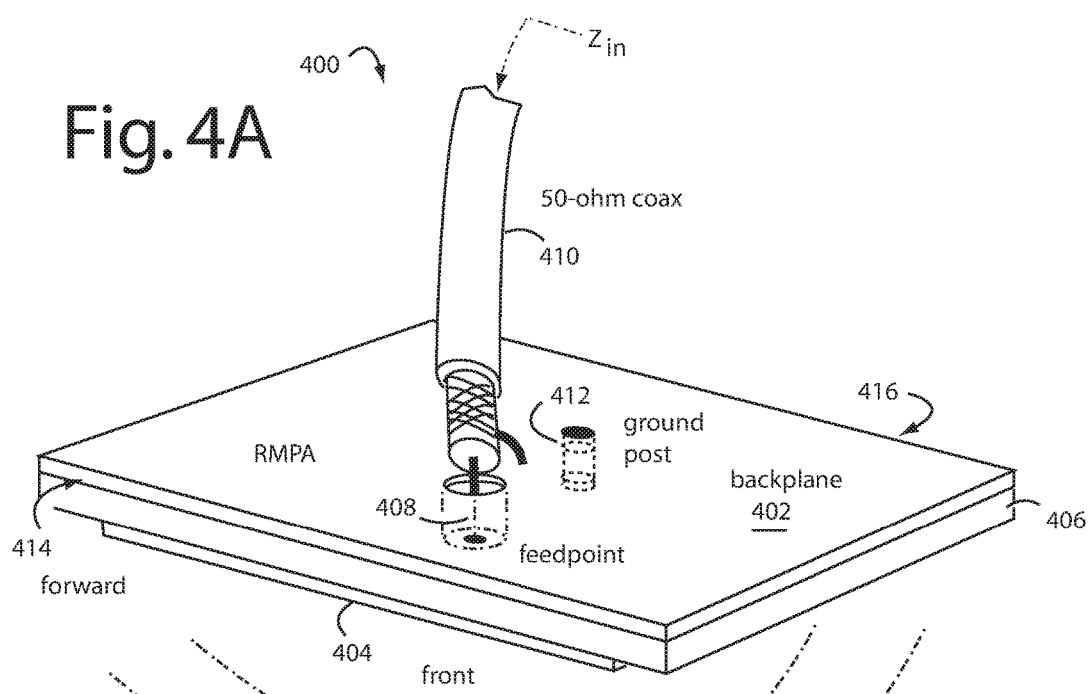
FIG. 4A is a perspective diagram of a resonant microstrip patch antenna showing how a relationship of a feedpoint to a groundpost.
Figure 4B:
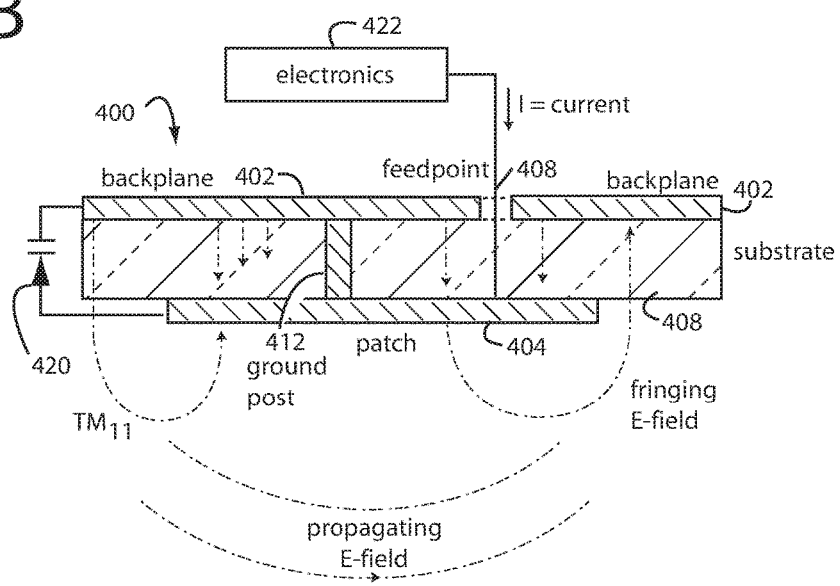
FIG. 4B is a cross sectional diagram of the resonant microstrip patch antenna of FIG. 4A and shows the relationships between the feedpoint, groundpost, fringing E-field, and a propagating E-field.

FalconView is a mapping system created by the Georgia Tech Research Institute. It was initially developed for the Windows family of operating systems. It displays various types of maps and geographically referenced overlays. Many types of maps are supported, but the primary ones of interest to most users are aeronautical charts, satellite images and elevation maps. FalconView also supports a large number of overlay types that can be displayed over any map background. A current overlay set is directed toward military mission planning users and is focused on aviators and aviation support personnel. FalconView is an integral part of the Portable Flight Planning Software (PFPS) and includes FalconView, Combat Flight Planning Software (CFPS), Combat Weapon Delivery Software (CWDS), Combat Air Drop Planning Software (CAPS) and several other software packages built by various software contractors. Current work includes the development of FalconView as part of XPlan, the Department of Defense's most recent mission planning system. The Joint Mission Planning System is also being added to FalconView as a plugin. The program has an active user community, and the Georgia Tech Research Institute plans events supporting the program. Wikipedia FIGS. 4A and 4B represent a resonant microstrip patch antenna (resonant microstrip patch antenna) 400 useful in connection with GPR 210 (FIG. 2). Such resonant microstrip patch antenna is detailed further in our United States Patent Application Publication US 2014/0306839, published Oct. 16, 2014, and titled ELECTROMAGNETIC DETECTION AND IMAGING TRANSCEIVER (EDIT) AND ROADWAY TRAFFIC DETECTION SYSTEM, application Ser. No. 13/862,379, filed Apr. 13, 2013, and incorporated herein in full by reference.

FIG. 4A represents a way to construct resonant microstrip patch antenna 400 using common FR4 printed circuit board material. A copper-foil backplane 402 and radiating patch 404 are separated by an epoxy substrate 406. A feedpoint 408 is drilled through the backplane 402 and substrate 406 so a 50-ohm coaxial cable can be attached to the radiating patch 404. A groundpost 412 is constructed by drilling and plating a copper via. The relationship of the feedpoint 408 to the groundpost 412 creates a forward radiating edge 414 and an aft radiating edge 416. The resonant microstrip patch antenna has a characteristic input impedance ($Z_{in}$) and resonant frequency ($F_R$) that are a function of the dielectric constant of substrate 406, objects in the radiated field, the separation distance of backplane 402 and patch 404, the distance between feedpoint 408 to the groundpost 412, and the plan dimension of patch 404. Herein, these all add up to a resonant frequency in the range of 100-MHz to 2-GHz, and a $Z_{in}$ of about 50-ohms when the radiation field is substantially comprised of air. Varactors 420 or other types of trimming capacitors can be added around the edges of resonant microstrip patch antenna 400 to fine-tune its resonant frequency.

It is important to good operation in this use here that the antenna be narrow band. Conventional antennas used in the GPR's we reference herein typically employ wideband antennas.

In the illustrated configuration, the resonant microstrip patch antenna is fed a constant frequency and the varactors are tuned to keep it at resonance despite changes in the media environment surrounding the resonant microstrip patch antenna. The "auto-correction" voltages sent to the varactors to keep the balance will therefore respond proportionally to changes in the media environment. The resonance is verified by observing minimas in the $Z_{in}$. Interpretations of the placement and relative movements of buried objects can, in one embodiment, be made by tracking the correction voltages sent to the varactors 420 necessary to minimize $Z_{in}$.

Scattering parameters (s-parameters) describe the scattering and reflection of traveling waves when a network is inserted into a transmission line. Here, the transmission line includes the soils and buried objects. S-parameters are normally used to characterize high frequency networks, and are measured as a function of frequency. So frequency is implied and complex gain and phase assumed. The incident waves are designated by the letter $a_n$, where n is the port number of the network. For each port, the incident (applied) and reflected waves are measured. The reflected wave is designed by $b_n$, where n is the port number. When the incident wave travels through a network, its gain and phase are changed by the scattering parameter. For example, when a wave $a_1$ travels through a network, the output value of the network is simply the value of the wave multiplied by the relevant S-parameter. S-parameters can be considered as the gain of the network, and the subscripts denote the port numbers. The ratio of the output of port-2 to the incident wave on port-1 is designated $S_{21}$. Likewise, for reflected waves, the signal comes in and out of the same port, hence the S-parameter for the input reflection is designated $S_{11}$. For a two-port network with matched loads:

$S_{11}$ is the reflection coefficient of the input;
$S_{22}$ is the reflection coefficient of the output;
$S_{21}$ is the forward transmission gain; and
$S_{12}$ is the reverse transmission gain from the output to the input.

S-parameters can be converted to impedance by taking the ratio of ($1+S_{11}$) to ($1-S_{11}$) and multiplying the result by the characteristic impedance, e.g., 50-ohms or 75-ohms. A Smith chart can be used to convert between impedance and S-parameters.

The frequency and impedance, or reflection coefficient ($S_{11}$), of resonant microstrip patch antenna 400 are measured to provide sensor information and interpretive reports. resonant microstrip patch antenna 400 is electronically tuned by a sensor controller either adjusting oscillator frequency and/or varactors to find the resonant frequency of the resonant microstrip patch antenna each time a measurement is taken. The $S_{11}$ (reflection coefficient) parameter is measured in terms of magnitude. The sensor controller seeks to minimize the magnitude of $S_{11}$, meaning resonant microstrip patch antenna 400 is near its resonant point and 50-ohms.

During an automatic steady state calibration, an iterative process is used in which a sensor controller seeks a minimum in $S_{11}$ by adjusting the applied frequency through an oscillator. Once a frequency minimum for $S_{11}$ is found, sensor controller adjusts a bias voltage on varactors connected to the edges of resonant microstrip patch antenna 400. The voltage variable capacitances of varactors are used to fine tune resonant microstrip patch antenna 400 into resonance, and this action helps drive the impedance as close to 50-ohms as possible. Sensor controller simply measures the $S_{11}$ magnitude minimum. Once voltage adjustments to varactors find a minimum in $S_{11}$ magnitude, the process is repeated with very fine adjustment steps in an automatic frequency control to find an even better minimum. The voltages to varactors are once again finely adjusted to optimize the minimum.

After calibration, an independent shift away from such minimum in $S_{11}$ magnitude means a buried object is affecting the balance. The reflection coefficient ($S_{11}$) will change away from the original "calibrated" resonance value. Typically a buried object passed overhead within the field will cause a peak maximum in the measured data. The rate of change of the measured signal in the area is directly related to the speed of the vehicle carrying resonant microstrip patch antenna 400.

$S_{11}$ has both magnitude and phase, a real and imaginary part. Changes in magnitude indicate a disturbance in the EM-field of resonant microstrip patch antenna 400, and changes in the phase provide the directionality of travel 110-113. Resonant microstrip patch antenna 400 is a linearly polarized antenna, the fields on one edge of resonant microstrip patch antenna 400 are 180-degrees out of phase from the field on the other edge. With a proper alignment of resonant microstrip patch antenna 400 in situ, buried objects passing in front of resonant microstrip patch antenna 400 from left to right, will produce a phase signature that is 180-degrees out of phase from other objects moving right to left. The phase at resonance can be corrected to provide a constant 180-degree shift.

FIG. 4B schematically represents resonant microstrip patch antenna 400 taken through a normal plane that longitudinally bisects both the ground post 412 and feedpoint 408. Varactor 420 is typical of many that can be connected to be voltage-controlled by electronics controller 422 to enable fine tuning of the resonant frequency of resonant microstrip patch antenna 400 to help with calibration and measurement sensing. The electronics controller 422 is able to measure parameter $S_{11}$ at the feedpoint 408 and thereafter issue interpretive reports.

At resonance, the electromagnetic fields radiate away from resonant microstrip patch antenna, as shown in FIG. 4B. A linearly polarized electric field fringes from the edges of the metalized, copper foil parts of resonant microstrip patch antenna 400. Such type of polarization is an important operational element, this polarization enables a directional indication. As applied here, the antenna radiation pattern has a very broad 3-dB beam width of ±30 degrees from the perpendicular to the plane of patch 404. This pattern is important in the present applications because the wide antenna pattern allows a large area to be electronically swept.

Figure 5A:
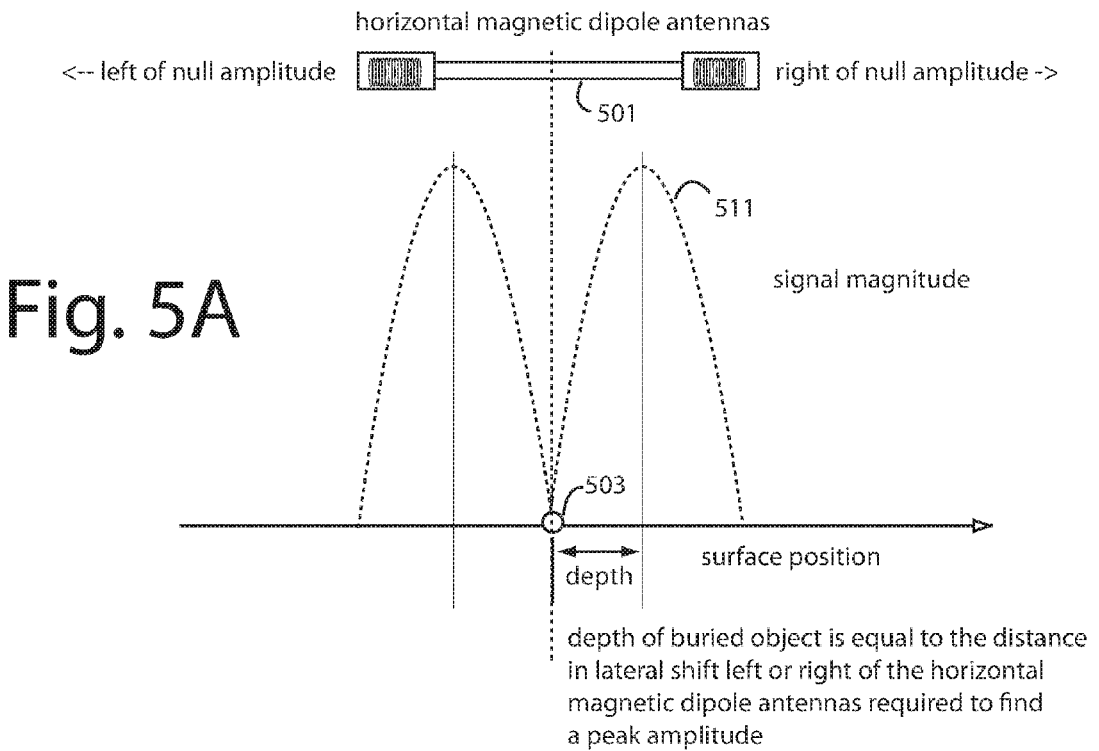
FIG. 5A is a schematic diagram of a horizontal magnetic dipole antenna and a graph of its gradiometer response to a buried object scattering an electromagnetic radio signal.
Figure 5B:
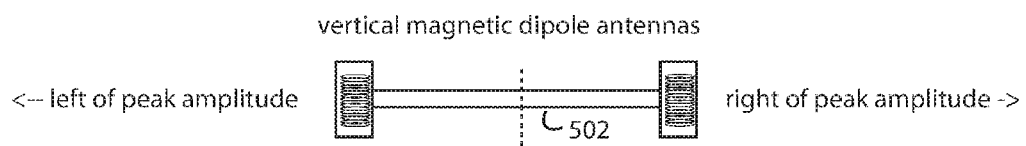
FIG. 5B is a schematic diagram of a vertical magnetic dipole antenna and a graph of its gradiometer response to a buried object scattering an electromagnetic radio signal.

FIGS. 5A and 5B represent how a horizontal-type magnetic dipole antenna 501 and a vertical-type magnetic dipole antenna 502 respectively respond with an EMG receiver and processor to a buried object 503 that is re-radiating radio energy from a local AM-Broadcast carrier. A waveform 511 in FIG. 5A results from the EMG receiver as horizontal-type magnetic dipole antenna 501 is moved left and right laterally overhead to buried object 503. A waveform 512 in FIG. 5B results from its EMG receiver when vertical-type magnetic dipole antenna 502 is moved left and right laterally overhead relative to buried object 503. The lateral distance that either antenna 501 or 502 must be moved to change between a peak and a null in EMG receiver waveforms 511 and 512 is approximate to the depth the object 503 is buried below the surface. It is therefore important to have very fine position fixes on antennas 501 and 502 at the instants they provide gradient waveforms 511 and 512. The position fixes provided by ordinary GPS receivers is usually not good enough without being assisted by photographic registrations of the ground surface at those same instants.

FIG. 6 represents a data collection method 600 in which four electromagnetic dipole antennas 601-604 and an antenna multiplexer 606 are mounted on a data collection vehicle 608. The data collection vehicle 608 is rolled over the surface of a search area looking for buried infrastructure like pipe 610. The antenna multiplexer 606 allows the four electromagnetic dipole antennas 601-604 to be selected in gradient-view pairs and coupled to an electromagnetic gradiometer receiver and processor in at least ten different ways. E.g., (1) gradient between A-B;
(2) gradient between B-A;
(3) gradient between A-C;
(4) gradient between C-A;
(5) gradient between A-D;
(6) gradient between D-A;
(7) gradient between B-C;
(8) gradient between C-B;
(9) gradient between B-D; and
(10) gradient between D-B.

Taking all ten gradient pair measurements will yield information about the pipe 610 and its relative lay under the surface.

Figure 7:
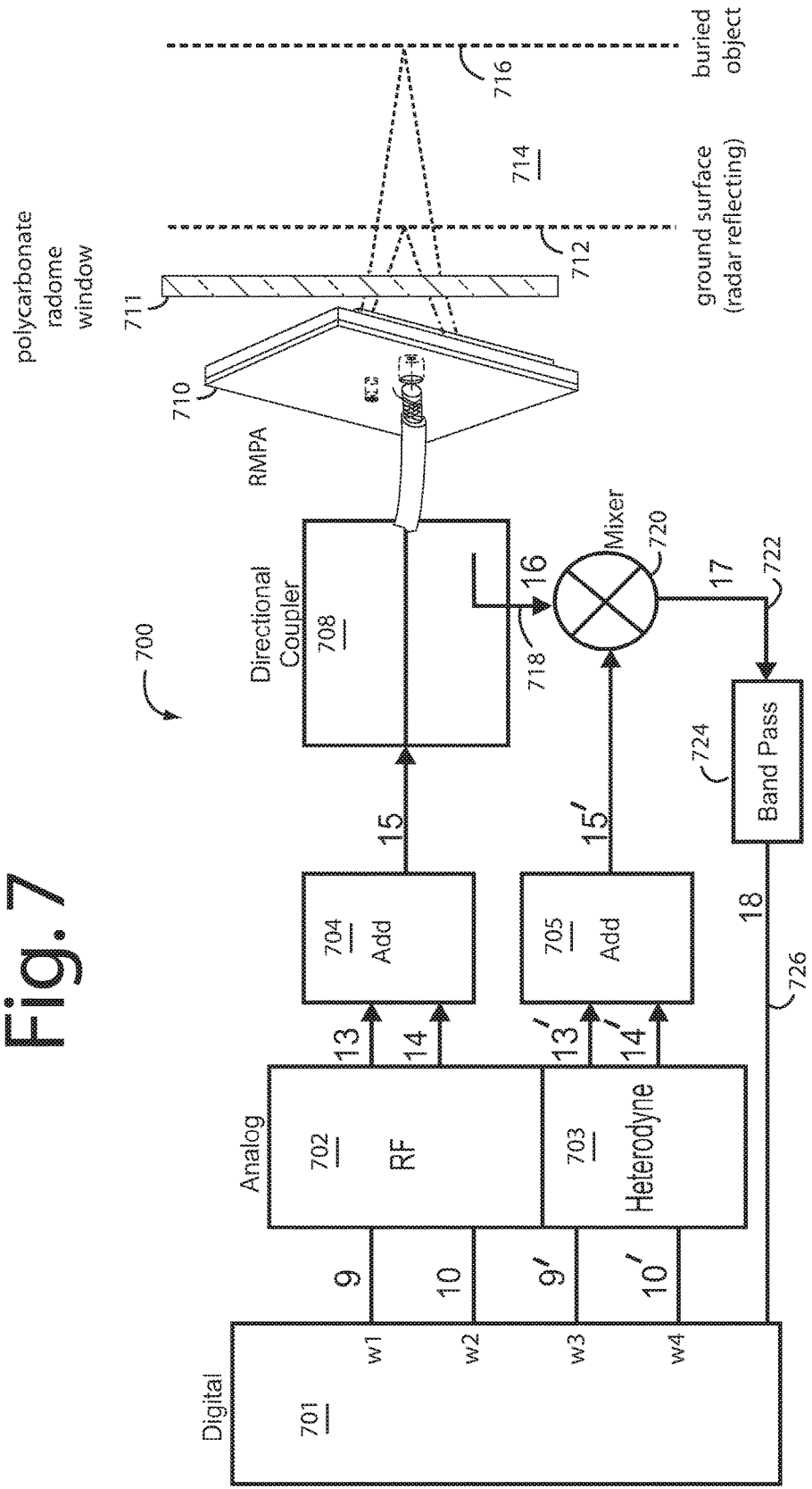
FIG. 7 is a schematic block diagram of a software defined radio transceiver for operation with the ground penetrating radar and RMPA.

FIG. 7 represents a GPR implementation in a software defined transceiver radar (SDTR) 700 that includes a digital signal processor 701, an analog radio frequency stage 702, a heterodyne frequency synthesizer 703, an RF adder 704, a local oscillator adder 705, a directional coupler 708, and an resonant microstrip patch antenna 710. These all launch RF transmissions through a protective polycarbonate radome window 711 into a ground surface 712, into soils 714, and reach a buried object 716. Return reflections are collected by a port 718 and beat down by a mixer 720 into an intermediate frequency 722. This is filtered by a bandpass 724 for processing by DSP 701.

In a prototype implementation of a software defined transceiver radar, the analog printed circuit board included a quadrature up converter, RF power amplifier, coupler (for a monostatic radar), phase locked loop (PLL), or several quad DOSs (Analog Device AD9959) and a down converter.

Software-defined transceiver radar (SDTR) 700, included digital and analog printed circuit boards (PCBs) for 701, 702, and 703. The digital PCB 701 produces four synthesized digital frequencies $\omega 1$, $\omega 2$, $\omega 3$, and $\omega 4$, respectively described by equations 7, 8, 7', and 8', in Table-V. Analog PCB 702 uses these to produce the radio frequency (RF) signals described by equations 13 and 14, and analog PCB 703 produces heterodyne signals described by equations 13' and 14', of Table-V (in our U.S. Pat. No. 7,656,342, issued Feb. 2, 2010, and titled, DOUBLE-SIDEBAND SUPPRESSED-CARRIER RADAR TO NULL NEAR-FIELD REFLECTIONS FROM A FIRST INTERFACE BETWEEN MEDIA LAYERS). Adders 704 and 705 sum these to produce a transmitter signal described by equation 15 and a synchronous mixer signal described by equation 15' of Table-V. A directional coupler 708 sends the transmitter signal through for launching into a radar media by an antenna 710. A first interface 712, a coal seam 714, and a second interface 716 are typical in the radar media. Any return reflections 718 extracted by directional coupler 708 are described by equation 16 of Table-V (in US and are detected by a mixer 720. The mixer output 722 is described by equation 17 of Table-V. A bandpass filter 724 removes the carrier and one of the sidebands for an output signal 726, and is described by equation 18 of Table-V. The digital PCB 701 then interprets signal 726 to estimate the character of first interface 712, coal seam 714, and second interface 716.

Figure 8:
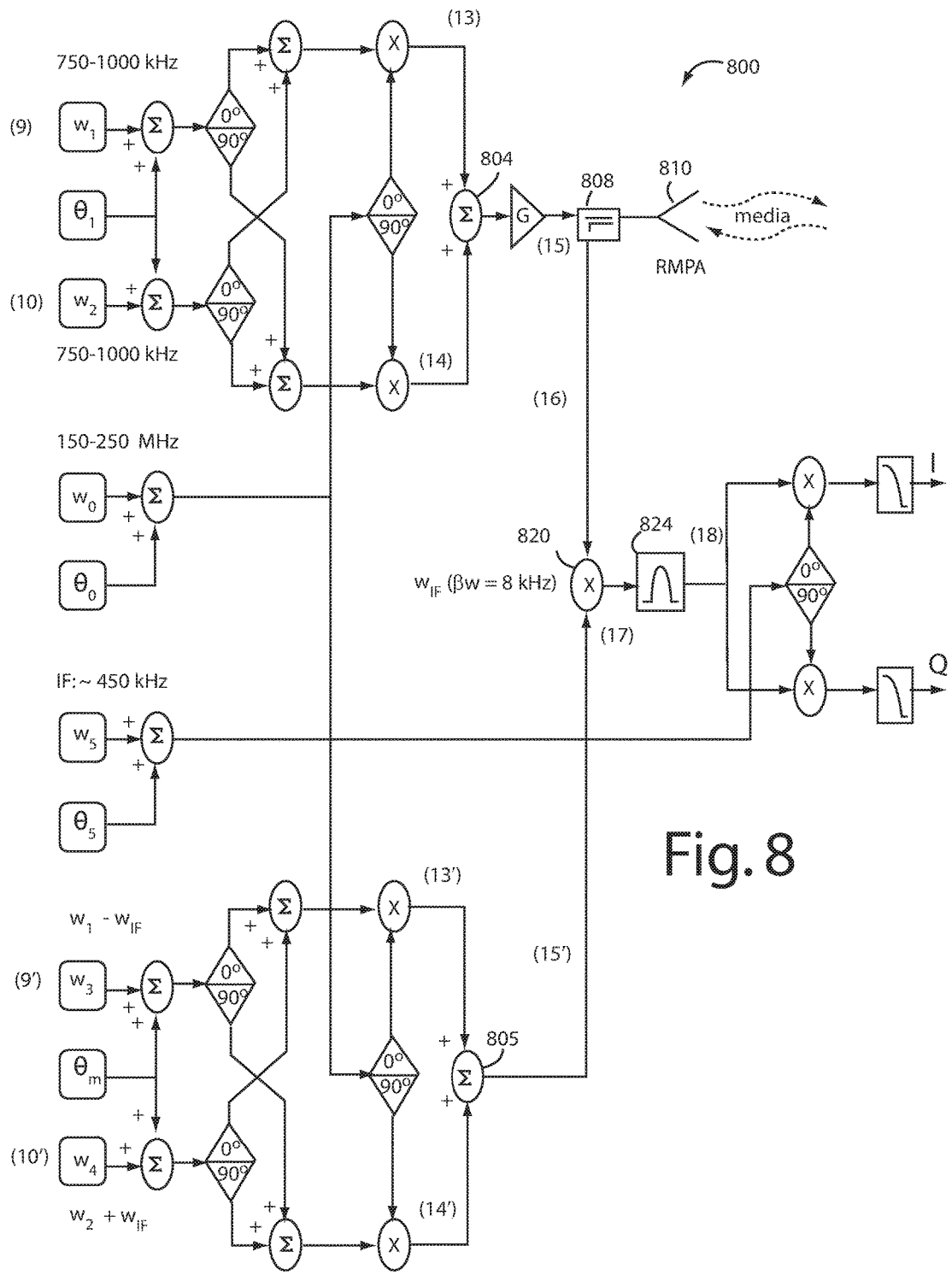
FIG. 8 is a frequency plan diagram for the software defined radio transceiver of FIG. 7.

FIG. 8 diagrams how the various equations of Table-V can be interrelated, and suggests how the circuitry of SDTR 700 can be configured to do the required signal processing. The inputs w1 and w2 are in the range of 750-1000 kHz and are summed with $\theta 1$ using phase splitters to produce upper and lower sidebands with a completely suppressed carrier at the output of an adder 804. Such is the equivalent of adder 704 in FIG. 7. This is amplified by an amplifier (G) before being applied to a directional coupler 808 and antenna 810. Such are equivalent to directional coupler 708 and antenna 710 in FIG. 7.

The mixer 720 must accommodate a reflection of +0-dB from the first-interface 712 reflected EM wave that is up to 80-dB greater than the second interface 716 reflected EM wave. This requires a radar receiver dynamic range greater than 80 dB (10,000). The mixer 720 performs sinusoidal waveform multiplication. The band pass filter 724 rejects all mixer output frequencies except the intermediate frequency (IF). The directional coupler 708 recovers the reflected wave. Phase-coherent detection is achieved by mixing the DDS with the reflected point signal and bandpass filtering the mixer output signal. An important feature of the phase-coherent detection scheme is that the in phase (I) and quadrature (Q) terms are simultaneously measured in the digital electronics 701. Simultaneous measurement improves noise immunity.

Surface reflection suppression is processed as illustrated in FIG. 8, an algorithm 800. Such is described in great detail in our U.S. Pat. No. 7,656,342, issued Feb. 2, 2010, and titled, DOUBLE-SIDEBAND SUPPRESSED-CARRIER RADAR TO NULL NEAR-FIELD REFLECTIONS FROM A FIRST INTERFACE BETWEEN MEDIA LAYERS. And such is incorporated herein by reference.

FIG. 8 diagrams how the various equations of Table-V in the Reference can be interrelated, and suggests how the circuitry of SDTR 700 can be configured to do the required signal processing. The inputs w1 and w2 are in the range of 750-1000 kHz and are summed with $f1$ using phase splitters to produce upper and lower sidebands with a completely suppressed carrier at the output of an adder 804. Such is the equivalent of adder 704 in FIG. 7. This is amplified by an amplifier (G) before being applied to a directional coupler 808 and antenna 810. Such are equivalent to directional coupler 708 and antenna 710 in FIG. 7.

Figure 9:
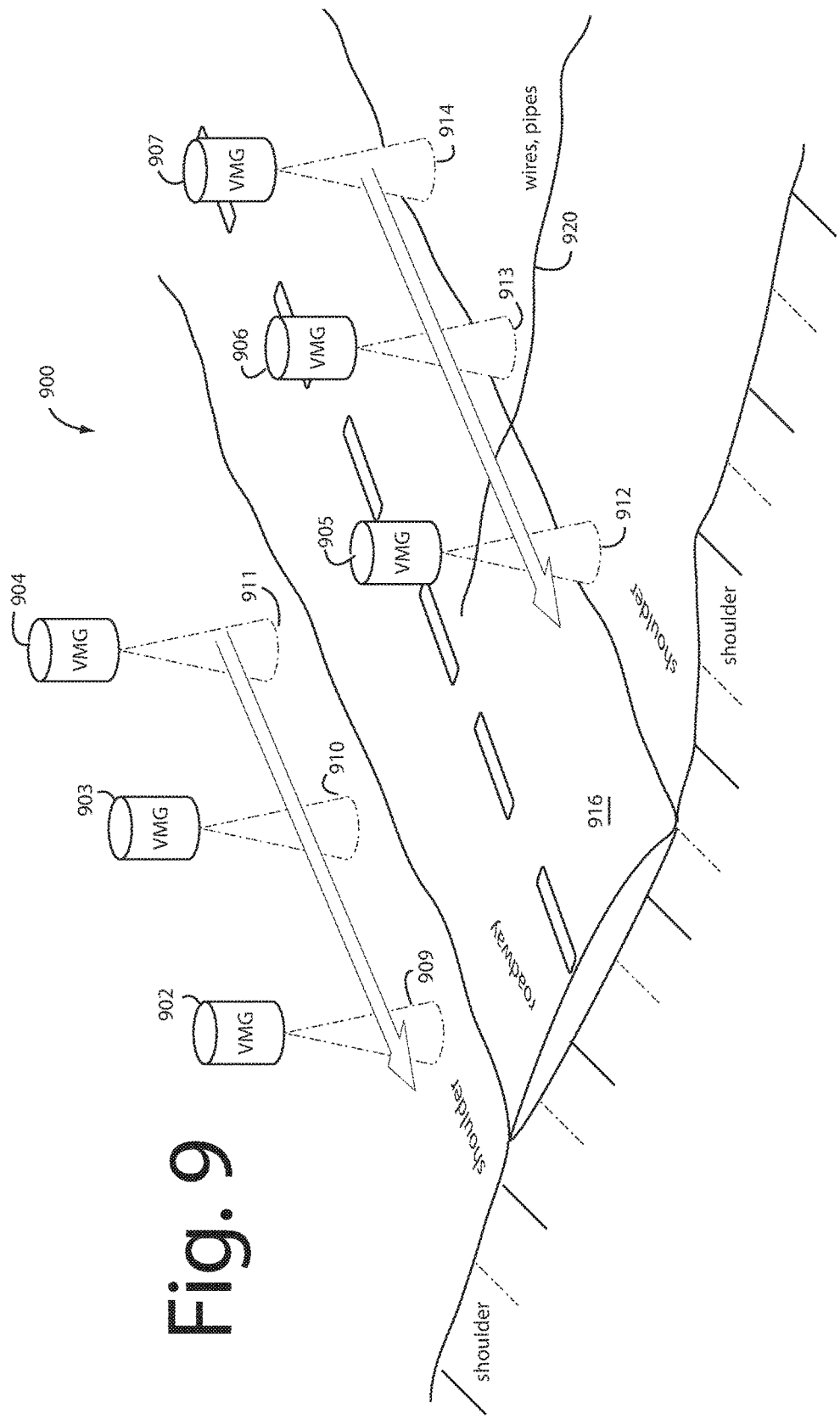
FIG. 9 is a perspective view diagram of how six VMG antennas can be flown in two arrays on outriggers over both shoulders of a road looking for buried pipes, wires, and other infrastructure.

FIG. 9 represents a ground vehicle application 900 in which six VMG's 902-907 are carried in two single-file arrays, one array on each side of a vehicle. These two VMG arrays are hung out on flip-down outriggers so that their ground nadirs 909-914 will run along the shoulders of a roadway 916. Pipes and wires 920 are illustrated here as an example, and for purposes of discussion here is shown to come from off one side of roadway 916 and to terminate about in the middle. Such wires can easily be 100-300 feet in length. The end point of such wires will uniquely radiate a spherically spreading pattern, while the rest of the wire will radiate a cylindrically spreading pattern. Precise endpoint determinations will look for this transition.

It should be obvious that VMG's 902-904 on the "wrong side" will not pass over pipes, wires 920 and therefore have little chance of detecting it. However, VMG's 905-907 on the "right" side will pass over, one at a time beginning with VMG 905 and quickly ending with VMG 907. So, if VMG's 902-907 are connected to a suitable signal processor while the vehicle carrying them is in forward motion, detection "blips" will occur in a string in VMG's 905-907, and none at the same time for VMG's 902-904. Wires that end under roadway 916 are of particular interest, and so they must be positively identified if stumbled upon.

It will usually be only the electric field component of the primary electromagnetic wave that can reach far enough to illuminate and induce significant current flow in surface and subsurface conductors. Such current flows cause cylindrically spreading secondary waves to propagate out over the conductors' length and are readily observable on and above the surface. These secondary waves will decay with the one-half power of distance from the radiating conductor. Electromagnetic surveys of the observables using magnetic dipole antennas will reveal the orientation, depths, and locations of infrastructures and networks otherwise hidden or not apparent.

The characteristics of the things radiating the secondary waves can be inferred by measuring the magnitudes, orientations, and phases of the secondary waves as they are received at various points on and above the ground surface. A difference in measurement between two identical receiving antennas, or two different measures of a moving antenna, can be plotted as a gradient. Embodiments of the present invention take measurements from the same antennas at different points in a survey area.

The primary wave, the electric field that travels directly from the transmitter to the receiver, is rejected by the way the receiving magnetic antennas are constructed. The magnetic gradients can then be measured without significant intrusion.

Gradient measurement devices are able to resolve much finer electronic details than can total field measurement devices. As the antennas and receiver pass over radiating conductive targets during a typical gradiometer survey of an area, many dips and peaks in the secondary wave magnitudes, and phase shifts and reversals will be observed. A total field measurement for the same area can appear as a homogeneous blur without any details. Small changes in the gradient fields will not look important in total field measurements. Gradient measurement receivers can be configured to naturally reject interfering, unwanted signals.

More recent advancements by Stolar Research in gradiometer technology have shown that single vertical magnetic dipole antennas configured as vector magnetometers can provide useful, detailed information about the presence and nature of wires, pipes, and other surface and subsurface conductors.

There are at least three practical ways to move a gradiometer over the ground surface: (a) handheld, (b) on a ground vehicle, or (c) on a low-flying airframe. The ground vehicle has a better chance of being able to tolerate larger power demands, heavier weights, and larger sizes, but all applications will benefit if these issues are minimized.

But, ground vehicles, especially small ones can jostle and bounce the receiving antennas so much that the gradiometer measurements are degraded by changing noise floors. Airframes can require minimum flying heights that demand too much separation distance, and the secondary waves are as a consequence made too faint to be detectable.

Figure 10:
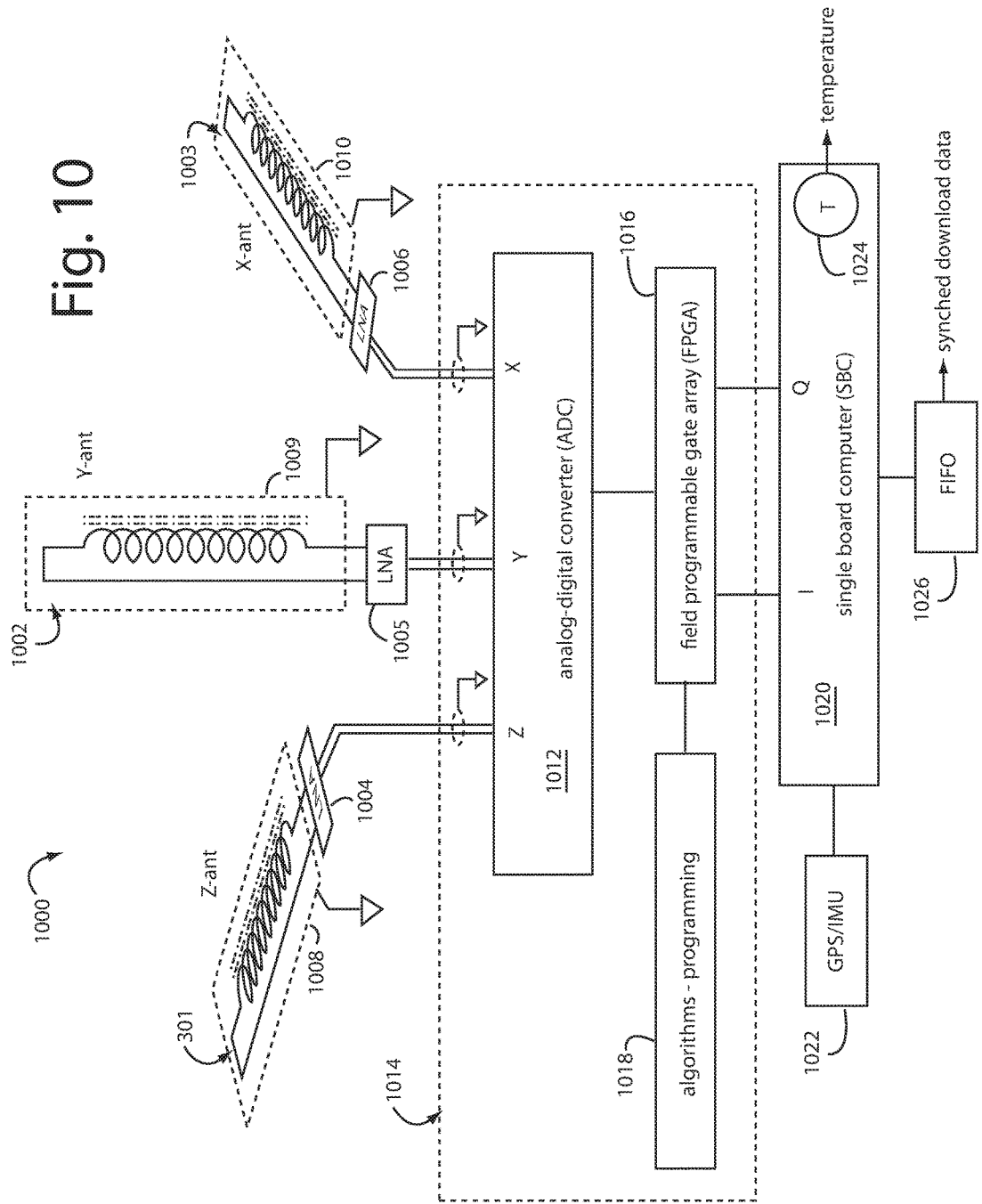
FIG. 10 is a schematic block diagram of a tri-axial VMG antenna and software defined radio transceiver for GPR use as in FIGS. 1-9.

FIG. 10 represents a VMG-type sensor cube and receiver embodiment of the present invention, and is referred to herein by the general reference numeral 1000. Three vector magnetometer type magnetic dipole antennas 1001-1003 are orthogonally arranged into X, Y, and Z orientations relative to a nadir spot on the ground surface of a search area. Each antenna is equipped with a low noise amplifier (LNA) 1004-1006. Capped cylindrical all-copper Faraday shields 1008-1010 on each antenna 1001-1003 are used to screen out primary wave electric fields from outside and still readily pass through the near-field secondary magnetic waves.

A software-defined radio (SDR) 1012 uses programming to define its radio modes. The three antennas are individually connected in a tri-axial arrangement to a multiplexed analog-to-digital converter (ADC) 1014. ADC 1014 samples and digitizes the analog electromagnetic signals for signal processing by a field programmable logic array (FPLA) 1016 according to algorithms and programming provided in a program memory 1018. See, Roger H. Hosking, "Putting FPGAs to Work in Software Radio Systems", (c) 2005-2013, Pentak, Inc. Upper Saddle River, N.J. 07458 http://www.pentek.com. FPLA 1016 outputs digital in-phase (I) and quadrature (Q) samples.

Any additional input channels available in ADC 1012 could be useful, e.g., in monitoring voltage, current, and temperature measurements to report and understand the system health. A single board computer (SBC) 1020 takes in the I-Q data and at the same time matches it with navigation data provided by a GPS receiver or inertial management unit (IMU) 1022. A temperature sensor 1024 is included to measure SBC operating temperatures. A FIFO register 1026 may need to be included to sync to other data links downloaded from the vehicle.

SDR 1014 provides a number of in-phase (I) and quadrature (Q) measurements of the magnetic signals respectively received by antennas 1001-1003. The number of I-Q channels provided is user selectable. In remote controlled vehicle applications, the I-Q channel data is synchronized with other systems and command data using first-in, first-out (FIFO) 1026 data registers. In some applications as many as 20,000 samples of raw ADC data needed to be buffered, e.g., to observe the noise signatures better, or to help throttle for downlink streaming. Vehicle ignition noise from the platform can be synchronized and blanked out to control the noise floor, e.g., by as much as 15-dB.

Software-defined radio (SDR) modules for unmanned aerial vehicle (UAV), radar, and communications applications can be implemented with the 4-channel, 200 MHz ADC XMC module and the Xilinx Virtex®-7 FPGA family. IP can be developed for it using the Xilinx ISE® Design Suite and the Pentek GateFlow FPGA Design Kit.

In general, the Y-antenna 302 is used to receive magnetic signals-of-interest from a small spot on the ground immediately below. The Z-antenna 301 and X-antenna 303 are used to locate and identify nearby transmitters-of-opportunity that may already be radio illuminating metallic subsurface and surface objects.

FIGS. 11A-11C illustrate one way to construct each of antennas 1001-1003. FIG. 11D shows how three antennas in a tri-axial arrangement can be orthogonally disposed in a weatherproof housing 1120. A vector magnetometer 1100 comprises a ferrite rod 1102 with a helical-wound coil 1104 about 3" long. The ferrite rod concentrates the magnetic fields received (on axis) with the same orientation. A hollow phenolic cylinder 1106 is coaxially placed around the ferrite rod and is filled with an insulating and stabilizing foam fill 1108, e.g., a two-part urethane foam.

A pattern of longitudinally arranged copper foil strips 1110 on the outside of the phenolic cylinder 1106 are connected together at each end by copper grounding rings 1111 and 1112. The result of this is to create a Faraday shield 1114 that allows only magnetic fields to penetrate to the inside to be sensed up by the helical-wound coil 1104. The best spacing, widths, and lengths of copper foil strips to use depend on the operating frequencies involved and can be empirically derived. Such copper foil strips can be etched from copper cladding laminated on the outside surface of the hollow phenolic cylinder 1106, as is done with common printed circuit boards.

Figure 12:
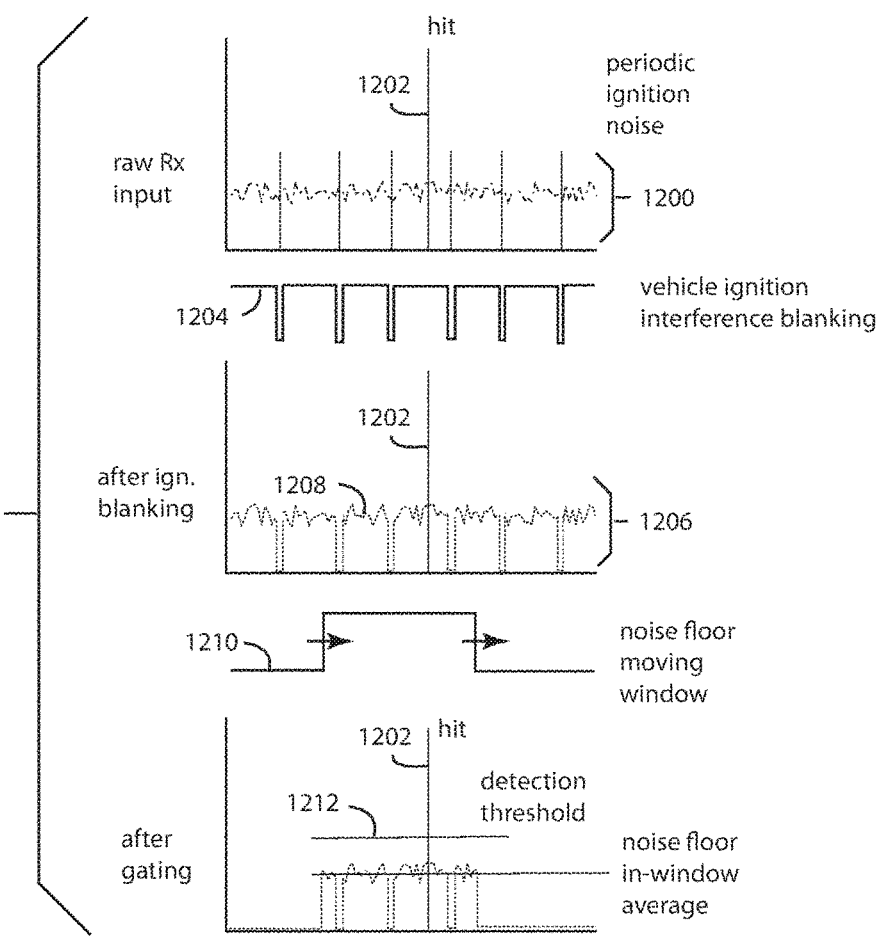
FIG. 12 is a diagram representing the signals obtained from VMG measurements over a survey area, and especially the noise floor that tends to increase when scanning over areas contaminated by bacteria that make the soils and waters conductive to electricity.

FIG. 12 represents a tri-axial sensor cube 1200 that packs, mounts, and weatherproofs three of the vector magnetometer devices, e.g., antennas 1100 as illustrated in FIGS. 11A-11C. A plastic weatherproof top 1202 screws onto and seals with a plastic housing 1204. Inside, three magnetic dipole antennas 1206-1208 are arranged orthogonal to one another. Each has a ferrite rod core 1210-1212, and a low noise amplifier (LNA) 1214-1216. These are wired to a bulkhead connector 1220. The insides of the three magnetic dipole antennas 1206-1208 are filled with insulating foam, like urethane, to provide support and resistance to strong vehicle vibrations.

In some applications, only the vertically oriented magnetic dipole antenna 1206-1208 is used to receive and measure magnetic gradients. The others are used like reference sampling antennas.

Referring again to FIG. 10, a hardware description language is used in electronic design automation to describe field-programmable gate arrays, integrated circuits, and other digital and mixed-signal systems. E.g., very-high-speed integrated circuit (VHSIC) Hardware Description Language (VHDL). VHDL can also be used as a general purpose parallel programming language. An algorithm was found to be needed in the VHDL programming 1018 used by FPGA 1016 to monitor data from ADC 1012 and to automatically blank noisy data from the signal processing. Such involved an M-of-N criteria to test if the noisy data rose above the rest of the data by a threshold amount, for example 20-dB. The data that met the criteria was blanked out. A delay/storage was therefore included in the original signal processing chain and additional state machines were used to check for the M-of-N criteria.

The various I-Q channels from FPGA 1016 can be processed locally or remotely after downloading by a general purpose microcomputer with a gradiometer software application program to detect and annunciate the locations, orientations, and depths of conductors in or on the ground in a survey area. Navigation receivers and maps are combined with the sensor cube 1200 to make the results more useful and easy to understand. For example, the instantaneous GPS navigation locations at which each I-Q data sample was obtained are registered and logged with the data downloaded for processing. FalconView, by Georgia Tech Professional Education, is a PC-based mapping application that can be advantageously included to provide meaningful and informative user displays. See, www.falconview.org.

The interpretation of gradiometer data has been described by Larry G. Stolarczyk, et al., in "Detection of Underground Tunnels with a Synchronized Electromagnetic Wave Gradiometer", AFRL-VS-HA-TR-2005-1066, c. 2005, Proceedings of SPIE Vol. 5778; and also, U.S. Pat. No. 7,336,079, "Aerial electronic detection of surface and underground threats", issued Feb. 26, 2008.

Operating from a ground vehicle or airframe usually involves fighting off electrical interference caused by internal combustion ignition systems and generator brushes. The electrical noise coming from an engine contributes to the overall noise floor seen by a receiver. Noise floors can rise high enough to inundate any signals of interest.

FIG. 12 represents how algorithms 1018 (FIG. 10) can be employed to overcome strong interference and produce more reliable detection results. A raw receiver input signal 1200 includes regular, periodic spikes caused by an engine ignition system. These can obscure or bury a signal-of-interest 1202 that is also a spike, but that is produced as a VMG passes over a buried conductive object. Field personnel call this a "hit". A vehicle ignition interference blanking gate 1204 is therefore added. This results in a partially cleaned up signal 1206.

A signal noise floor 1208 is represented by the ragged tops of signal 1206 in FIG. 12. Such noise floor 1208 can rise and fall with vehicle motion and terrain changes. We have observed that the noise floor rises when passing over areas of contaminated soils in which bacteria have been active and left ionized elements conductive to electricity. We also observed this same phenomenon inside tunnels on their wet floors. The very high humidity in mines promotes both aerobic and anaerobic bacteria blooms. Pools of water inside mines are unusually conductive and will reflect and scatter radio energy.

Changes in the noise floor make using a fixed squelch levels impractical because the best squelch level to use changes minute-by-minute. The best noise floor level to use is therefore automatic, being computed constantly from only the most recent samples. This is graphically represented by a moving window gate 1210 that is 3-5 seconds wide which allows noise floor samples to be read. A detection threshold 1212 is automatically raised and lowered according to a most recent noise floor calculation from inside moving window gate 1210. If any hit 1202 exceeds the detection threshold 1212, that hit becomes validated as a real target detection. The real-time position of the VMG at the time of the validated hits are logged and used to paint a map and/or sound an operator alarm.

The ill effects of electromagnetic interference (EMI) proved difficult to control in prototypes that were built. Multiple shields were needed in the interconnecting cables as were shielded connectors. The receiver electronics required an eight-layer PCB board design with full power planes and generous decoupling. The receiver and a general purpose single board computer (SBC) were isolated into separate compartments. Differential line drivers and signal lines were needed from the antenna. Low-pass and bandpass filters on the low noise amplifier and receiver boards. Diesel motors have an advantage over gasoline engines in that ignition systems are not needed and the interference they cause are not present and need not be contended with. The Faraday shields 1008-1010 (FIG. 10) further reduce EMI.

Single point VMG measurements are rather meaningless in isolation. The conductor to be detected needs to move, or the VMG needs to move relative to the conductor, and several measurements with location positions are collected and compared.

The double-sideband gradiometric ground penetrating radar resonant microstrip patch antenna is driven with two different phase-coherent reflected double-sideband waveform signals from the cluttering geology air-to-soil interface (e.g., cluttering geologic noise) caused by variations in moisture, type of buried object rock and fragmentation of the trona oil shale buried object rocks. The early arrival time cluttering geologic noise from the air-to-soil interface has an average magnitude of −6.6 dBm. The detection problem now becomes evident. The magnitude of the late arrival time (late arrival time) reflected double-sideband signal (S) from the floor trona oil shale buried object interface is a factor of 5.5 times less than the early arrival time double-sideband signal reflected cluttering geologic noise from the air-to-soil interface interface.

There is a significant difference in round trip travel time (t) between the early arrival time cluttering geologic noise and the late arrival time double-sideband signal (S) reflected from the trona oil shale buried object interface. The EM wave velocity (v) in the trona layer is C (e.g., 3×108 m/s) divided by the square root of the relative dialectic constant of trona) and slows down to 1.09×10 8 m/s. When the cutting edges are 609 mm (1 foot) from the trona oil shale buried object interface, the round trip travel time ($t_{trona}$ oil shale buried object) is 5.6 nanoseconds. The ERT double-sideband signal round trip travel time ($t_{ATB}$) is less than 0.05 nanosecond.

The double-sideband gradiometric ground penetrating radar transmission and receiving paths are not totally isolated from each other, and this makes detection more difficult. When a single resonant microstrip patch antenna sensor is used in a double-sideband gradiometric ground penetrating radar design, an integrated directional coupler (DC) is needed. The directional coupler has a directivity specification that seldom exceeds −30 dB. The magnitude of early arrival time coupler transmit path leakage double-sideband signals is −30 dBm in the receiver channel.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A method of mapping underground utility infrastructures and other buried objects, comprising:
    investigating buried objects point-by-point in an immediate search area of a ground surface radio illuminated by a radio broadcast transmitter in the 500-kHz to 1,000-kHz band transmitting from a location outside the immediate search area;
    sensing together short-wavelength reflections of 100-MHz to 2,000-MHz and long-wavelength scattering of the electro-magnetic radio energy of the radio broadcast transmitter from buried objects underneath in layered soils with a surface-based measurement of buried-object signals using at least a phase-coherent elimination of ground surface reflection noise of at least sixty decibels in digital signal processing with a field programmable gate array (FPGA); and
    interpreting signals and displaying visual representations and characteristic descriptions of underground utility infrastructures and the buried objects sensed together, located, and clarified, with a mapping apparatus capable of displaying aeronautical charts, satellite images, elevation maps, and geographically referenced overlays that can be displayed and printed over any map background.

2. The method of claim 1, further comprising:
    repeatedly roving over a wide search area with a municipal vehicle that carries the equipment that:
    collects measurements and images from a series of locations of the ground surface of an area with a vehicle that carries a navigation receiver, a camera, a ground penetrating radar, and an electromagnetic gradiometer;
    fixes a location of the vehicle with the navigation receiver and converting it into a location fix data of the vehicle location and storing such in a computer memory storage device;
    photographs the ground surface appearance of said location of the vehicle with the camera and converting it into an image data of the ground surface and storing such in said computer memory storage device as a visual registration;
    radar images from close above the ground surface of said location of the vehicle with the ground penetrating radar that includes an apparatus with an algorithm for suppressing ground surface reflections, and converting radar data obtained into an image data of shallow objects and storing such in said computer memory storage device with said visual registration;
    measures electromagnetic gradients from close above the ground surface of said location of the vehicle with the electromagnetic gradiometer, and converting gradient data obtained into an image data of more deeply objects that are re-radiating electromagnetic radio waves caused in far-zone by local AM-radio broadcasts, and storing such in a computer memory storage device with said visual registration;
    combines, blends, and transforms said location fix data, image data of the ground surface, image data of shallow objects, and image data of more deeply objects, into a voxel information data and storing such in said computer memory storage device with said visual registration;
    repeats these steps from a plurality of successive new municipal vehicle locations until a survey area can be visually rendered on a display screen or map from a patchwork of the data stored in said computer memory storage device.

3. A method of mapping underground utility infrastructures and buried objects, comprising:
    collecting measurements and images from a series of locations of the ground surface of an area with a vehicle that carries a navigation receiver, a camera, a ground penetrating radar, and an electromagnetic gradiometer;
    fixing a location of the vehicle with the navigation receiver and converting it into a location fix data of the vehicle location and storing such in a computer memory storage device;
    photographing the ground surface appearance of said location of the vehicle with the camera and converting it into an image data of the ground surface and storing such in said computer memory storage device as a visual registration;

radar imaging from close above the ground surface of said location of the vehicle with the ground penetrating radar that includes an apparatus with an algorithm for suppressing ground surface reflections, and converting radar data obtained into an image data of shallow objects and storing such in said computer memory storage device with said visual registration;

measuring electromagnetic gradients from close above the ground surface of said location of the vehicle with the electromagnetic gradiometer, and converting gradient data obtained into an image data of more deeply objects that are re-radiating electromagnetic radio waves caused in far-zone by local AM-radio broadcasts, and storing such in a computer memory storage device with said visual registration;

combining, blending, and transforming said location fix data, image data of the ground surface, image data of shallow objects, and image data of more deeply objects, into a voxel information data and storing such in said computer memory storage device with said visual registration;

repeating the above steps from a plurality of successive new vehicle locations until a survey area can be visually rendered on a display screen or map from a patchwork of the data stored in said computer memory storage device.

4. The method of claim 3, further comprising:

displaying on a display screen or map a representation of all those vehicle locations that have been surveyed and those that are yet-to-be surveyed; and repeating the preceding steps from a plurality of new vehicle locations indicated as yet-to-be surveyed until said survey area can be visually rendered completely on a display screen or map from a patchwork of the data stored in said computer memory storage device.

* * * * *